(12) United States Patent
Raszuk

(10) Patent No.: US 8,503,293 B2
(45) Date of Patent: *Aug. 6, 2013

(54) HEALTH PROBING DETECTION AND ENHANCEMENT FOR TRAFFIC ENGINEERING LABEL SWITCHED PATHS

(75) Inventor: Robert Raszuk, Warsaw (PL)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/348,917

(22) Filed: Jan. 12, 2012

(65) Prior Publication Data

US 2012/0106359 A1 May 3, 2012

Related U.S. Application Data

(63) Continuation of application No. 12/410,601, filed on Mar. 25, 2009, now Pat. No. 8,139,479.

(51) Int. Cl.
*G01R 31/08* (2006.01)
(52) U.S. Cl.
USPC ............ 370/228; 370/218; 370/225; 370/276
(58) Field of Classification Search
None
See application file for complete search history.

(56) References Cited

U.S. PATENT DOCUMENTS

| | | | |
|---|---|---|---|
| 7,765,306 | B2 | 7/2010 | Filsfils et al. |
| 2008/0225888 | A1 | 9/2008 | Valluri et al. |
| 2008/0240121 | A1 | 10/2008 | Xiong et al. |
| 2009/0010153 | A1 | 1/2009 | Filsfils et al. |
| 2009/0225652 | A1 | 9/2009 | Vasseur et al. |
| 2009/0279542 | A1 | 11/2009 | Wong et al. |
| 2010/0061230 | A1 | 3/2010 | Xiong et al. |
| 2010/0149969 | A1 | 6/2010 | Rahman et al. |

OTHER PUBLICATIONS

Co-pending U.S. Appl. No. 12/410,601, filed Mar. 25, 2009 entitled "Health Probing Detection and Enhancement for Traffic Engineering Label Switched Paths" by Raszuk, 45 pages.

*Primary Examiner* — Kibrom T Hailu
(74) *Attorney, Agent, or Firm* — Harrity & Harrity, LLP

(57) ABSTRACT

A method performed by a network device may include establishing performance-based Bidirectional Forwarding Detection (BFD) sessions for each link of a primary traffic engineering Label Switched Path (TE-LSP) and establishing performance-based BFD sessions for each link of a secondary TE-LSP. The method may also include, monitoring performance of the primary TE-LSP based on the performance-based BFD sessions for each link of the primary TE-LSP and monitoring performance of the secondary TE-LSP based on the performance-based BFD sessions for each link of the secondary TE-LSP. The method may further include determining that the performance of the primary TE-LSP is degraded based on the monitoring of the performance of the primary TE-LSP and automatically switching a flow of data unit traffic from the primary TE-LSP to the secondary TE-LSP when the performance of the primary TE-LSP is degraded.

20 Claims, 7 Drawing Sheets

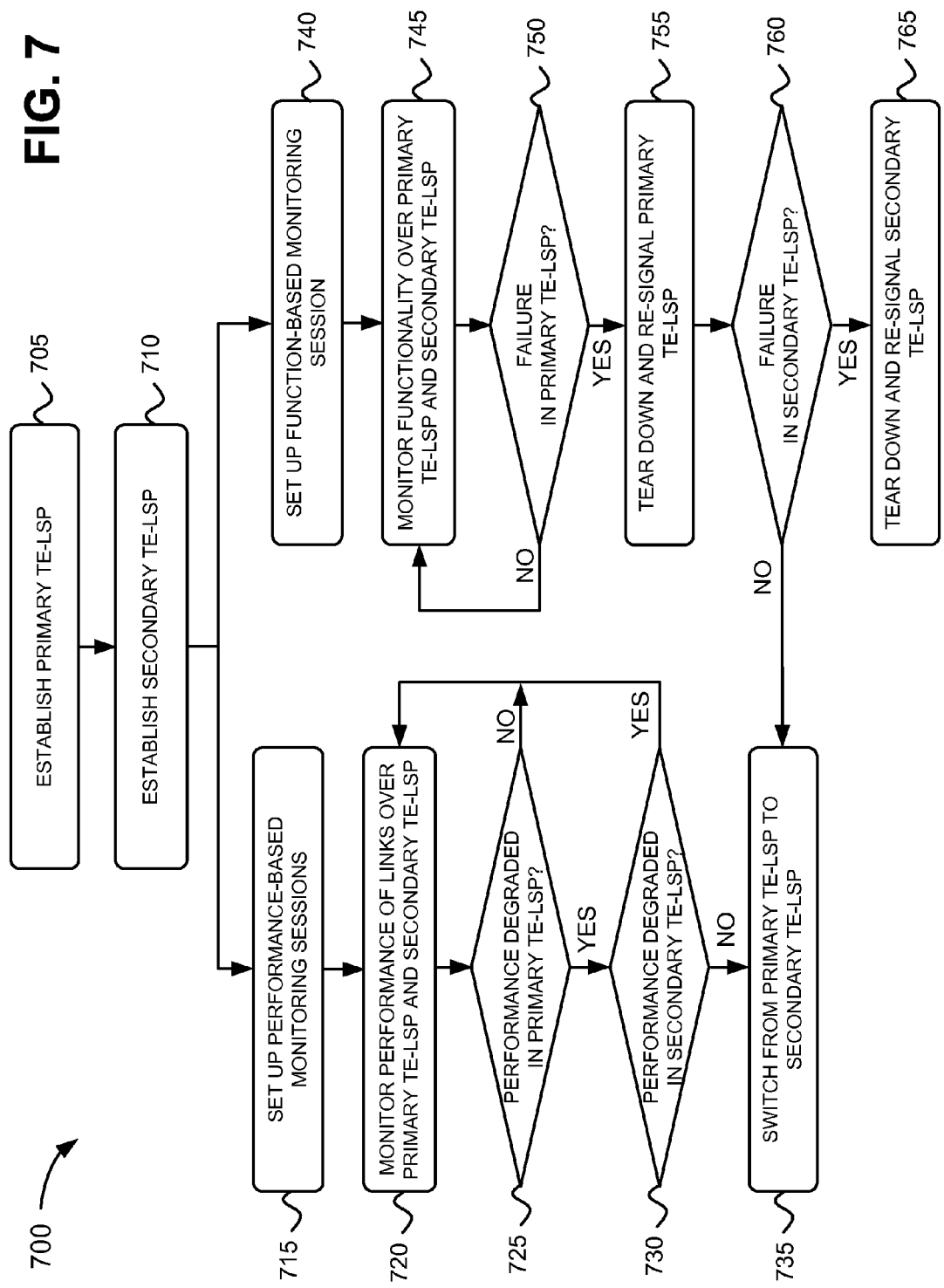

HEALTH PROBING DETECTION AND ENHANCEMENT FOR TRAFFIC ENGINEERING LABEL SWITCHED PATHS

RELATED APPLICATION

This application is a continuation of U.S. patent application Ser. No. 12/410,601 filed Mar. 25, 2009, which is incorporated herein by reference.

BACKGROUND

In a multiprotocol label switching (MPLS) network, a signaling protocol may be used to set up a label switched path (LSP) in the MPLS network. MPLS may permit a network to direct a flow of packets along a predetermined path (e.g., a LSP) across the network. As part of setting up the LSP, label switching routers (LSRs) included in the MPLS network may set up a label information base (LIB) that maps an incoming label from an input port of the LSR to an output port of the LSR. The LSRs may forward packets along links through the MPLS network based on labels attached to the packets that indicate which LSP to use. The label may be swapped to a new label at each node hop. In this way, a LSP may identify the specific path of nodes (e.g., routers) and links that the packets take through the MPLS network. Traffic Engineering (TE) may be implemented in the MPLS network to provide better performance. TE may steer some of the traffic scheduled to follow the original LSP to an alternate path to enable better bandwidth management and utilization between a pair of routers. Thus, a traffic engineering label switched path (TE-LSP) may not be bound to a specific path to a destination node.

Resource reservation protocol (RSVP) for TE-LSPs may be used to communicate control plane reservations across a network. RSVP may be used by either a host or a router to request or deliver specific qualities of services (QoS) for application data streams or flows. RSVP may define how applications place reservations and how they may relinquish the reserved resources once the need for them has ended. In RSVP TE-LSPs, various protection mechanisms can be used to protect against link and node failures. These failure mechanisms may construct a bypass tunnel across a protected link/node. Generally, the bypass tunnel gets used only in case of failure.

In some customer networks, TE-LSPs are used for forwarding mission critical applications. Often TE-LSPs use Layer 2 circuits that are provisioned and sold by third parties and/or that the customer does not control. As a fail-safe mechanism, customers may typically provision two of such LSPs over disjointed paths.

SUMMARY

A method, performed by a device, may include establishing performance-based Bidirectional Forwarding Detection (BFD) sessions for each link of a primary traffic engineered Label Switched Path (TE-LSP), and establishing performance-based BFD sessions for each link of a secondary TE-LSP. The method may also include monitoring performance of the primary TE-LSP based on the performance-based BFD sessions for each link of the primary TE-LSP, and monitoring performance of the secondary TE-LSP based on the performance-based BFD sessions for each link of the secondary TE-LSP. The method may further include determining that the performance of the primary TE-LSP is degraded based on the monitoring of the performance of the primary TE-LSP, and automatically switching a flow of data unit traffic from the primary TE-LSP to the secondary TE-LSP when the performance of the primary TE-LSP is degraded.

A node in a network including a plurality of nodes may include a control unit to establish a performance-based Bidirectional Forwarding Detection (BFD) session with an adjacent node of a primary traffic engineered Label Switched Path (TE-LSP), establish a performance-based BFD session with an adjacent node of a secondary TE-LSP, determine that the performance of the primary TE-LSP is degraded based on the BFD session, determine that the performance of the secondary TE-LSP is acceptable based on another one of the BFD sessions, and provide an indication that the performance of the primary TE-LSP is degraded and that the performance of the secondary TE-LSP is acceptable. The network device may also include an output port to send BFD packets over the primary TE-LSP, an output port to send BFD packets over the secondary TE-LSP, an input port to receive BFD packets over the primary TE-LSP, and an input port to receive BFD packets over the secondary TE-LSP.

A method may be performed in a network including a plurality of nodes connected by a plurality of links, one set of links forming a primary traffic engineering Label Switched Path (TE-LSP) and another set of links forming a secondary TE-LSP. The method may include establishing a Bidirectional Forwarding Detection (BFD) session for each link of the primary TE-LSP and for each link of the secondary TE-LSP, identifying a BFD packet loss associated with the primary TE-LSP, and determining whether the BFD packet loss indicates TE-LSP performance degradation or TE-LSP failure. The method may also include, if the BFD packet loss indicates TE-LSP performance degradation, then determining that the performance of the secondary TE-LSP is acceptable and automatically switching a flow of data unit traffic from the primary TE-LSP to the secondary TE-LSP. The method may further include, if the BFD packet loss indicates TE-LSP failure, then determining that the secondary TE-LSP has not failed and automatically switching a flow of data unit traffic from the primary TE-LSP to the secondary TE-LSP.

A device may include means for establishing a performance-based Bidirectional Forwarding Detection (BFD) sessions for each link of a primary traffic engineering Label Switched Path (TE-LSP) and a secondary TE-LSP, means for determining that the performance of the primary TE-LSP is degraded based on the one of the BFD sessions, means for determining that the performance of the secondary TE-LSP is acceptable based on another one of the BFD sessions, and means for automatically switching a flow of data unit traffic from the primary TE-LSP to the secondary TE-LSP based on the determining the performance of the secondary TE-LSP is acceptable.

A method of monitoring quality in a network connection may include establishing a first Bidirectional Forwarding Detection (BFD) session for a primary connecting path; establishing a second BFD session for a secondary connecting path, the secondary connecting path being at least partially non-congruent with the primary connecting path; monitoring the primary connecting path for both performance degradation and path failure based on the first BFD session; and monitoring the secondary connecting path for both performance degradation and path failure based on the second BFD session; and automatically switching a flow of data unit traffic from the primary connecting path to the secondary connecting path when the monitoring the primary connecting path indicates the performance of the primary connecting path is degraded and the monitoring the secondary connecting path indicates the performance of the secondary LSP is acceptable.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 7 is an exemplary process to implement enhanced quality detection in a network.

DETAILED DESCRIPTION

The following detailed description refers to the accompanying drawings. The same reference numbers in different drawings may identify the same or similar elements. Also, the following detailed description does not limit the invention.

Systems and methods described herein may use Bidirectional Forwarding Detection (BFD) sessions over a set of traffic engineering-label switched path (TE-LSP) connections. The BFD sessions may include aggressive monitoring to detect degraded performance (e.g., dropped packets, jitter and/or delays over a threshold limit) over a primary TE-LSP and one or more secondary TE-LSPs. When degraded performance is detected over a TE-LSP connection, a network node may automatically switch from the primary TE-LSP to a secondary TE-LSP, if the secondary TE-LSP is not also experiencing degraded performance.

In one implementation, a two-stage BFD system may be used. A performance stage may include a layer of BFD sessions that may run over each of the atomic TE-LSPs to detect dropped packets, jitter, and/or delays over a configured threshold. The performance stage BFD sessions may run combined over the number ("N") of TE-LSP sessions in an endpoint-to-endpoint connection. A function-based stage may include another BFD session that may run over the bundle of TE-LSPs in the endpoint-to-endpoint connection to monitor for path failures.

In another implementation, a single BFD session may be used on each of the atomic TE-LSPs within an endpoint-to-endpoint connection. Each of the BFD sessions may have a dual reaction mode in the event of a degraded performance indication (e.g., a BFD packet loss). The dual reaction mode may fail the TE-LSP when BFD packet loss is encountered over a configured time period ("X"), while a switchover to another healthy TE-LSP may take place when a BFD packet loss has been observed for a shorter time period ("Y").

As used herein, the term "bidirectional forwarding detection" (BFD) may refer to substantially continuous monitoring of a route or a data path for faults in both forward and reverse directions. As used herein, the term "jitter" may refer to a variation in packet transit delay between endpoints in a network.

EXEMPLARY SYSTEM OVERVIEW

Figure 1:
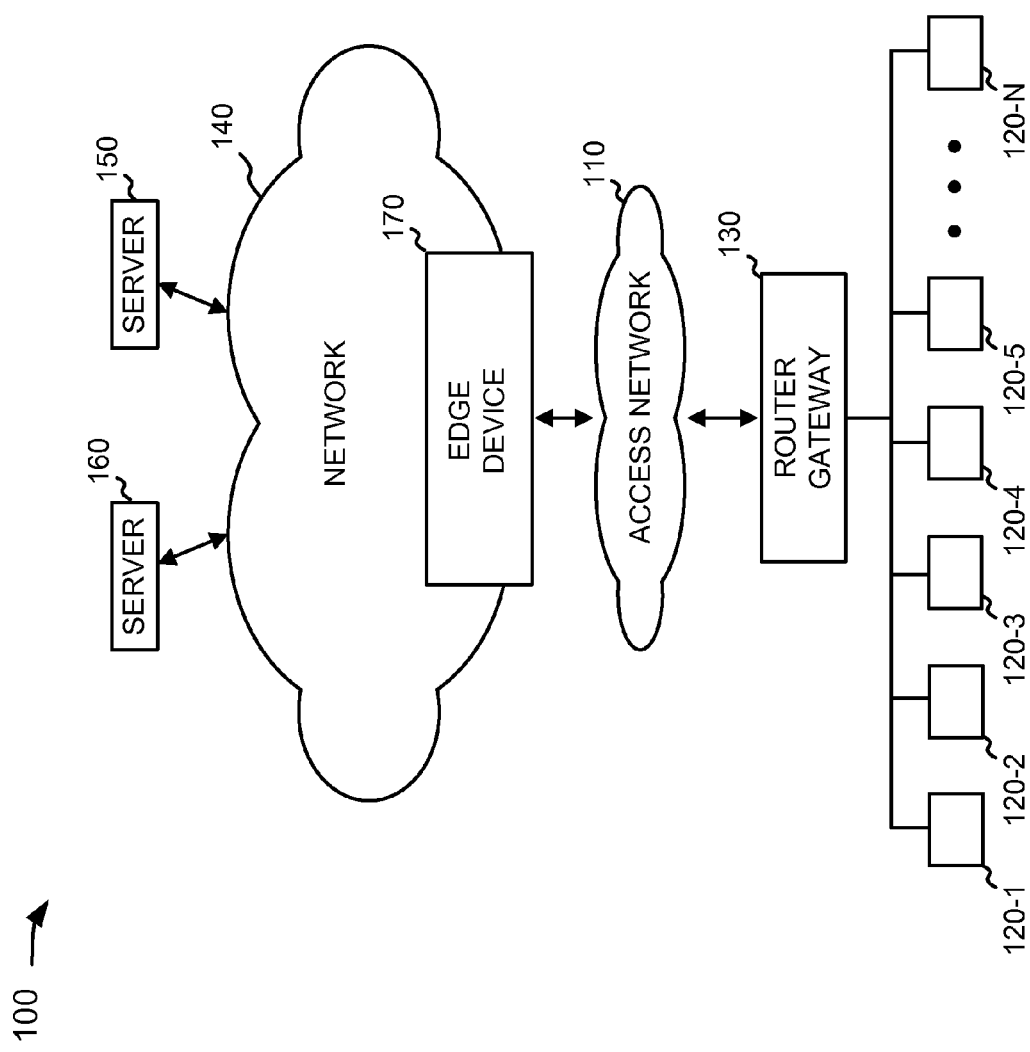
FIG. 1 is a diagram illustrating an exemplary network in which systems and methods described herein may be implemented.

FIG. 1 is a diagram of an exemplary system 100 in which systems and methods described herein may be implemented. As illustrated, system 100 may include access network 110, user devices 120-1 to 120-N, router gateway 130, network 140, server 150, server 160, and edge device 170. It will be appreciated that the number of devices illustrated in FIG. 1 is provided for simplicity. In practice, a typical system may include more or fewer devices than illustrated in FIG. 1. Moreover, system 100 may include other devices (not shown) that aid in the reception, processing, and/or transmission of data.

Access network 110 may include any network capable of transferring a data unit. "Data unit," as used herein, may refer to any type of machine-readable data having substantially any format that may be adapted for use in one or more networks, such as access network 110. A data unit may include packet data and/or non-packet data. Implementations of access network 110 may include a network that connects a network 140 to a router gateway 130. Access network 110 may be constructed as a Layer 2 network (data link layer) in the Open Systems Interconnection (OSI) reference model. Access network 110 may be a hardwired network using wired conductors and/or optical fibers and/or may be a wireless network using free-space optical and/or radio frequency (RF) transmission paths. Implementations of networks and/or devices operating on networks described herein are not limited to any particular data type and/or protocol.

User devices 120-1 through 120-N (collectively referred to as user devices 120) may include any device capable of transmitting and/or receiving data from access network 110. For example, user devices 120 may include a personal computer, a laptop computer, a personal digital assistant (PDA), a television, a telephone device, a video game console, a web-enabled cellular telephone, or another computation or communication device. User devices 120 may connect to router gateway 130 via any type of connection, such as wired and/or wireless connections.

Router gateway 130 may include a device capable of receiving data from user devices 120 and routing the data to/through access network 110. Router gateway 130 may also receive data from access network 110 and route the data to the appropriate user device 120. In one implementation, router gateway 130 may be a public interface to access network 110. In another implementation, router gateway 130 may include a digital user line access multiplexer (DSLAM). Router gateway 130 may operate in cooperation with servers 150 and 160 to provide respective communication services to user devices 120, for example.

Network 140 may include any network capable of transferring a data unit as described above. Implementations of network 140 may include local area networks (LANs), public switched telephone network (PSTN), metropolitan area networks (MANs) and/or wide area networks (WANs), such as the Internet, that may operate using substantially any network protocol, such as Internet protocol (IP), asynchronous transfer mode (ATM), and/or synchronous optical network (SONET). Network 140 may include network devices, such as routers, switches, firewalls, and/or servers (not shown). Network 140 may be a hardwired network using wired conductors and/or optical fibers and/or may be a wireless network using free-space optical and/or radio frequency (RF) transmission paths. Implementations of networks and/or devices operating on networks described herein are not limited to any particular data type and/or protocol.

Server 150 may include one or more processors or microprocessors enabled by software programs to perform functions, such as data storage and transmission, codex conversion, and interfacing with server 160 and edge device 170, for example. Server 150 may also include a data storage memory such as a random access memory (RAM) or another dynamic storage device that stores information such as user device information for establishing IP and BFD sessions, as described in detail below.

Server 150 may also include a communication interface that may include any transceiver-like mechanism that enables server 150 to communicate with other devices and/or systems. For example, server 150 may include a modem or an Ethernet interface to a LAN. In addition, server 150 may include other mechanisms for communicating data via a network, such as a wireless network. For example, server 150 may include one or more RF transmitters and receivers for transmitting and receiving RF signals.

Server 150 may include a computer device that stores and/or runs applications to validate, establish and monitor IP and BFD protocol sessions. Server 150 may also be configured as a RADIUS server to provide and/or aid in providing media content to users associated with user devices 120. For example, media content may be transmitted in an established static IP session in a DSL connection. Media content may include, for example, video-on-demand, live or pre-recorded television or radio broadcasts, streaming music, on-line gaming, or other voice and/or video content. In fact, media content may include any content that is stored or dynamically generated in real-time on one or multiple network devices.

Server 160 may include one or more processors or microprocessors enabled by software programs to perform functions, such as data storage and transmission, codex conversion, and interfacing with server 150 and edge device 170, for example. Server 160 may also include a data storage memory such as a RAM or another dynamic storage device that stores information. Server 160 may also include a communication interface that may include any transceiver-like mechanism that enables server 160 to communicate with other devices and/or systems. For example, server 160 may include a modem or an Ethernet interface to a LAN. In addition, server 160 may be configured as a Dynamic Host Configuration Protocol (DHCP) server that stores and/or runs applications to provide network resources to user devices 120.

Edge device 170 may include hardware or a combination of hardware and software to store information related to routing of data between servers 150 and 160 and user devices 120, via router gateway 130 and access network 110. In one implementation, edge device 170 may establish and monitor IP and BFD protocol sessions between, for example, user devices 120 and/or router gateway 130 and server 160. In other implementations, edge device 170 may be configured as a router, a firewall device, a switch, a server, and/or broadband network gateway, for example. Edge device 170 may also retrieve user profile information from server 150, for example. User profile information may include a user IP address and information necessary to validate and establish IP sessions and to establish and create BFD protocol sessions. An exemplary edge device 170 is described below with reference to FIGS. 2-3.

EXEMPLARY NETWORK DEVICE CONFIGURATION

Figure 2:
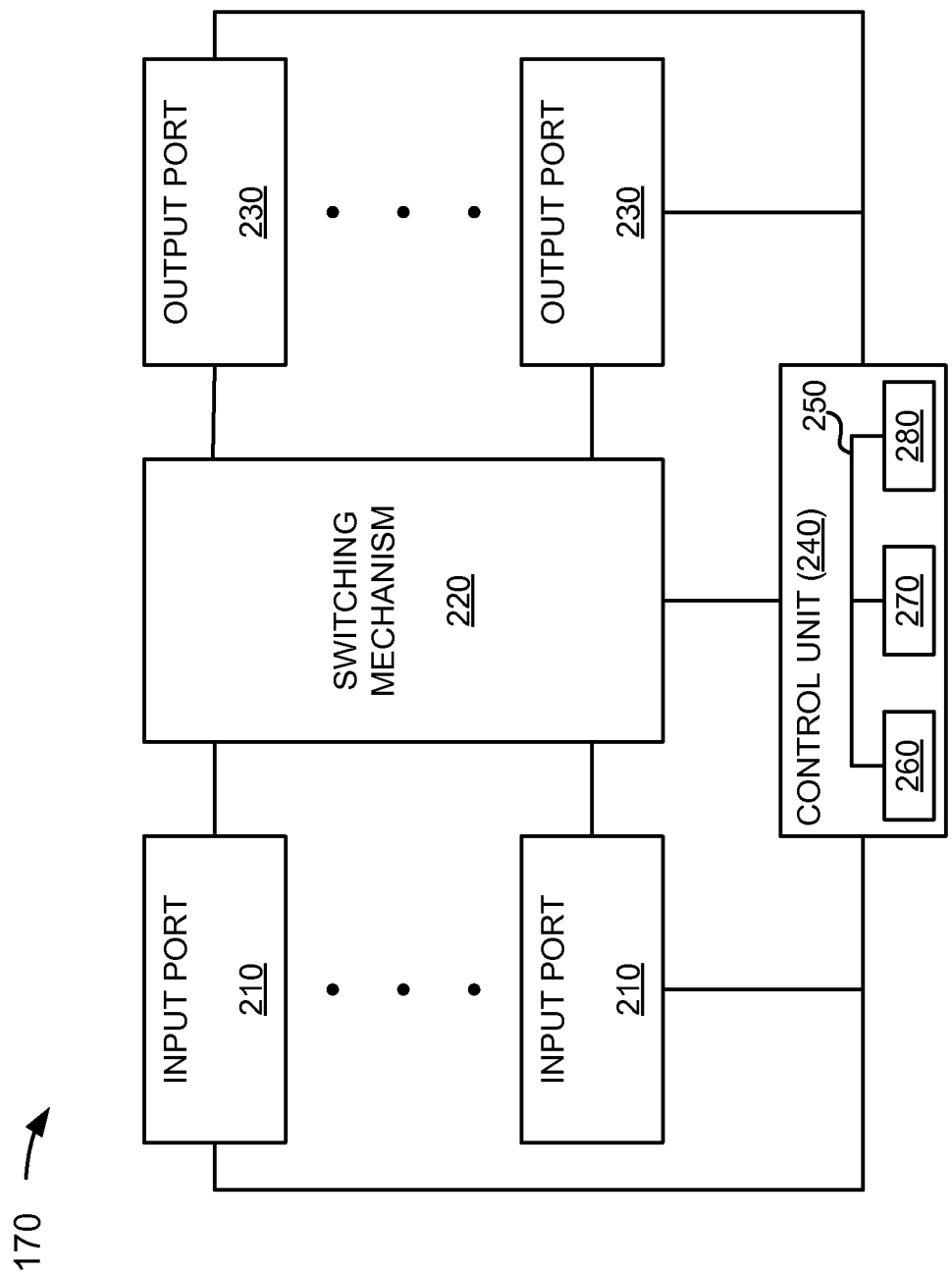
FIG. 2 is a diagram of an exemplary device that may correspond to a node of FIG. 1 according to an exemplary implementation.

FIG. 2 illustrates an exemplary architecture for implementing edge device 170 of FIG. 1. It will be appreciated that router gateway 130 and/or other devices in system 100 may be similarly configured.

Edge device 170 may include input ports 210, a switching mechanism 220, output ports 230, and a control unit 240. Each of the input ports 210 may connect to a physical link (not shown) and may be the point of entry for incoming data units. Switching mechanism 220 may interconnect input ports 210 with output ports 230. Each of output ports 230 may store data units and may schedule data units for service on a physical link (not shown). Control unit 240 may participate in routing protocols and may create a forwarding table that is used in data unit forwarding.

Input ports 210 may carry out datalink layer encapsulation and decapsulation. Input ports 210 may look up a destination address of an incoming data unit in a forwarding table to determine its destination port (i.e., route lookup). In order to provide QoS guarantees, input ports 210 may classify data units into predefined service classes. Input ports 210 may run datalink-level protocols or network-level protocols.

Switching mechanism 220 may be implemented using many different techniques. For example, switching mechanism 220 may include one or more busses, crossbars, and/or shared memories. The simplest switching mechanism 220 may be a bus that links input ports 210 and output ports 230. A crossbar may provide multiple simultaneous data paths through switching mechanism 220. In a shared-memory switching mechanism 220, incoming data units may be stored in a shared memory and pointers to data units may be sent from input ports 210 to output ports 230.

Output ports 230 may store data units before the data units are transmitted on an output link (e.g., link 120). Output ports 230 may include scheduling algorithms that support priorities and guarantees. Output ports 230 may support datalink layer encapsulation and decapsulation, and/or a variety of higher-level protocols.

Control unit 240 may interconnect with input ports 210, switching mechanism 220, and output ports 230. Control unit 240 may compute a forwarding table, implement routing protocols, and/or run software to configure and manage edge device 170. Control unit 240 may process any data unit whose destination address may not be found in the forwarding table.

In one implementation, control unit 240 may include a bus 250 that may include a path that permits communication among a processor 260, a memory 270, and a communication interface 280. Processor 260 may include a microprocessor or processing logic that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by the processor. Communication interface 280 may include any transceiver-like mechanism that enables control unit 240 to communicate with other devices and/or systems.

Edge device 170, as described herein, may perform certain operations, as described in detail below. Edge device 170 may perform these operations in response to processor 260 executing software instructions contained in a computer-readable medium, such as memory 270. A computer-readable medium may be defined as a physical or logical memory device.

The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of edge device 170, in other implementations, edge device 170 may contain fewer, different, differently arranged, or additional components than depicted in FIG. 2. In still other implementations, a component of edge device 170 may perform one or more other tasks described as being performed by another component of edge device 170.

EXEMPLARY FUNCTIONAL DIAGRAM

Figure 3:
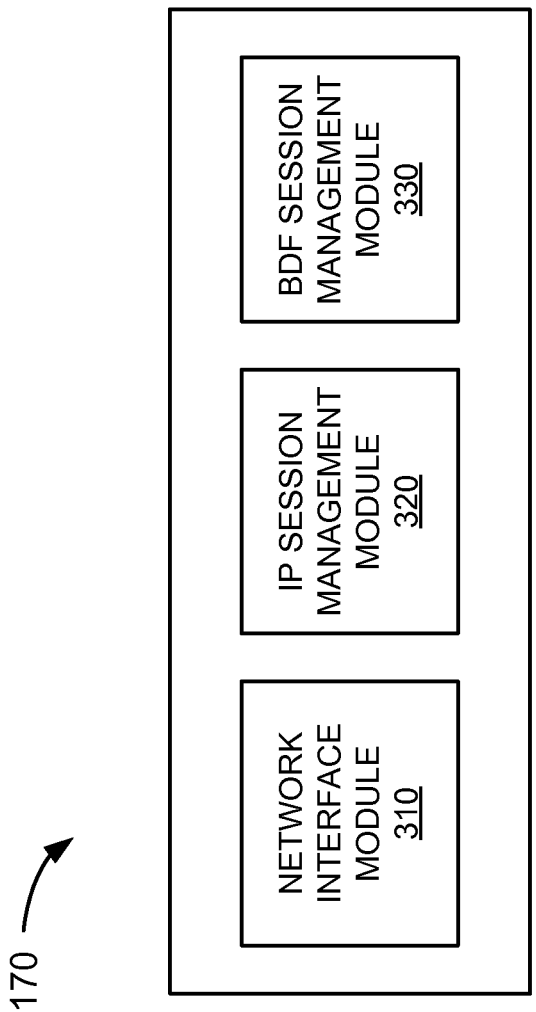
FIG. 3 is a functional block diagram of the control unit of FIG. 2.

FIG. 3 provides an exemplary functional diagram of edge device 170. Edge device 170 may include network interface module 310, IP session management module 320, and Bidirectional Forwarding Detection (BFD) session management module 330. In other implementations, edge device 170 may include fewer, additional, or different types of functional components than those illustrated in FIG. 3. In other implementations, router gateway 130 may contain similar components. In one embodiment, edge device 170 may be configured to function as a DHCP server or as a DHCP Relay/Proxy.

Network interface module 310 may include hardware or a combination of hardware and software to route data between user devices 120 and servers 150/160 according to applicable network policies. In one implementation, network interface module 310 may establish a network interface between user devices 120 and network 110 upon receiving a connection request from user devices 120. In one implementation, network interface module 310 may configure a virtual router associated with an established network interface. Network interface module 310 may assign network addresses to the respective network interfaces. In one implementation, the network interface may include routes for data transmissions to/from user devices 120 and routes to/from servers 150/160. Network interface module 310 may be implemented in control unit 240 or elsewhere in edge device 170.

IP session management module 320 may include hardware or a combination of hardware and software for control unit 240 to process instructions or data related to establishing and maintaining an IP session. For example, IP session management module 320 may be implemented in processor 260 and may make IP session information available to another device, software module, or component operating in edge device 170, such as BFD session management module 330. IP session management module 320 may include IP session information that identifies one or more network parameters and policies related to user device 120. In one implementation, IP session management module 320 may include IP session information downloaded from server 510, via network interface module 310, for example. An IP session may be established between edge device 170 and a remote device, such as router gateway 130, for example.

BFD session management module 330 may include hardware or a combination of hardware and software to process instructions or data related to establishing and maintaining Bidirectional Forwarding Detection (BFD) protocol sessions. In one implementation, BFD session management module 330 may notify network interface module 310 and/or servers 150/160 of the creation and/or deletion of a BFD session. BFD protocols may enable data transfer between devices in the forwarding plane. In one implementation, BFD session management module 330 may receive BFD session parameters and policies from server 150, via network interface module 310. In another implementation, BFD session management module 330 may automatically create a BFD session in response to the creation of an IP session.

BFD session management module 330 may store parameters relating to establishing and maintaining a BFD session such as a BFD session enable flag, a BFD mode (e.g., asynchronous mode or demand mode), a frequency or time period between BFD packet transmissions, a number of BFD packet polls unanswered indicating an IP session or connection failure, an alarms enable flag, and/or a LSP switching flag. BFD sessions operating in asynchronous mode may require each endpoint sending BFD control packets to the other endpoint at predetermined intervals. BFD sessions operating in demand mode may include use of BFD control packets as well as BFD echo packets that may be sent by and returned to the originating endpoint.

EXEMPLARY BFD MONITORING

Figure 4:
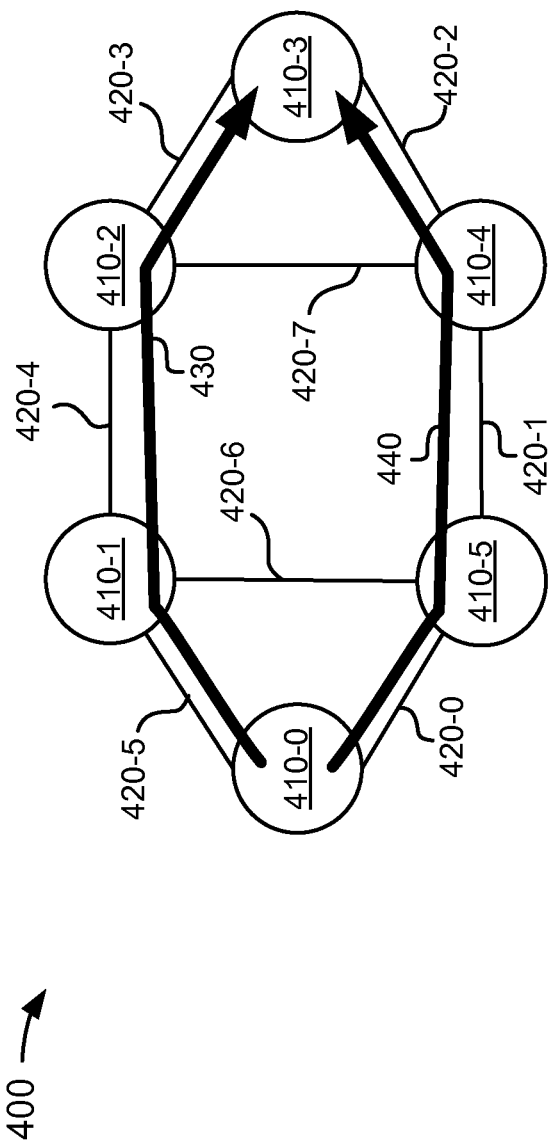
FIG. 4 is a diagram of an exemplary MPLS network with a primary a TE-LSP and a secondary TE-LSP.

FIG. 4 provides an example of an MPLS network 400 using a primary TE-LSP and a secondary TE-LSP. Network 400 may correspond to network 110 and/or network 140 of FIG. 1. As shown in FIG. 4, network 400 may include network devices 410-0, 410-1, . . . , 410-5 (collectively referred to as network devices 410, or generically as network device 430) interconnected by links 420-0, 420-1, . . . , 420-7 (collectively referred to as links 420, or generically as link 420). While six network devices 410 and eight links 420 are shown in FIG. 4, more or fewer network devices 410 and/or links 420 may be used in other implementations. Network 400 may also include other components, devices, etc. (not shown in FIG. 4).

Network device 410 may include any network device, such as a computer, a router (e.g., a label edge router (LER) or a label switching router (LSR)), a switch, a network interface card (NIC), a hub, a bridge, etc. In one implementation, network device 410-0 may serve as an ingress node and correspond to edge device 170. Link 420 may include a path that permits communication among network devices 410, such as wired and/or wireless connections.

For the discussion to follow, assume that network 400 is a MPLS network, that network device 410-0 is an LER (or entry point for a data unit), and that network device 410-3 is an egress LSR (or exit point of a data unit) in network 400. As shown in the example of FIG. 4, network 400 includes a primary TE-LSP 430 between network device 410-0 and network device 410-3 and a secondary TE-LSP 440 between network device 410-0 and network device 410-3. Depending on the TE-LSP selected, any of network devices 410-1, 410-2, 410-4, and 410-5 may serve as transit nodes between network device 410-0 and network device 410-3.

Network device 410-0 may receive a data unit, and may classify the data unit based on a variety of factors into a forwarding equivalent class (FEC). An FEC may include a set of data units that may be treated the same for forwarding purposes and may be mapped to a single label. A data unit may be encapsulated in a MPLS shim header that may contain a short, fixed-length locally-assigned label that may be based on the FEC.

Primary TE-LSP 430 may include network device 410-0, transit nodes 410-1 and 410-2, and network device 410-3 connected by links 420-5, 420-4, and 420-3. Multiple BFD sessions may be established at each network device to monitor performance and/or functionality of TE-LSP 430. For example, assuming all aspects of TE-LSP 430 are functioning properly, a set of BFD echo requests may transit from network device 410-0 over link 420-5 to network device 410-1, another set of BFD echo requests may transit from network device 410-1 over link 420-4 to network device 410-2, and still another set of BFD echo requests may transit from network device 410-2 over link 420-3 to network device 410-3.

Each of network devices 410 may reply to a BFD echo request with a BFD echo reply. Additionally or alternatively, in one implementation, a single BFD session may be established to monitor functionality of the entire TE-LSP 430.

Secondary TE-LSP 440 may include network device 410-0, transit nodes 410-5 and 410-4, and network device 410-3 connected by links 420-0, 420-1, and 420-2. If all or part of TE-LSP 430 fails, secondary TE-LSP 440, may be used to avoid all or a particular link of TE-LSP 430. BFD sessions may be used to monitor performance and/or functionality of TE-LSP 440. For example, assuming all aspects of TE-LSP 440 are functioning properly, a set of BFD echo requests may transit from network device 410-0 over link 420-0 to network device 410-5, another set of BFD echo request may transit from network device 410-5 over link 420-1 to network device 410-4, and still another set of BFD echo request may transit from network device 410-4 over link 420-2 to network device 410-3. Additionally or alternatively, in one implementation, a single BFD session may be established to monitor functionality of the entire TE-LSP 440.

When using TE-LSP 430, network device 410-0 may forward a data unit with the MPLS shim header to the next-hop network device, (e.g., network device 410-1). Each network device along TE-LSP 430 may make a forwarding decision based on the label carried in the MPLS shim header. The data unit forwarding process may be based on the concept of label switching. In this way, a TE-LSP may identify the specific path of network devices 410 and links 420 that a data unit(s) takes through MPLS network 400. The labeled data unit may be forwarded along TE-LSP 430 by each network device until the data unit eventually arrives at egress network device 410-3. The MPLS shim header may be removed from the data unit by either egress network device 410-3 or by the network device preceding egress network device 410-3 (e.g., by network device 410-2 for TE-LSP 430). If required, network device 410-3 may make a forwarding decision for the data unit based on the destination address carried in the network layer header of the data unit.

Using RSVP protocols, for example, particular network devices 410 and/or links 420 within network 400 may be protected against link and/or node failures by constructing a bypass tunnel across the protected network device 410 and/or link 420. A bypass tunnel may be statically configured for each network device 410 and/or link 420 that is being protected on each network device 410 in the TE-LSP.

In implementations described herein, secondary 440 TE-LSP may be assigned within network 400 in the event primary TE-LSP 430 fails or experiences degraded performance. BFD sessions may be established to concurrently monitor performance over both primary TE-LSP 430 and secondary TE-LSP 440 to identify failures and/or performance degradation. If degraded performance is indicated in only primary TE-LSP 430, the network 400 may switch from primary TE-LSP 430 to secondary TE-LSP 440 based on the monitored performance of each TE-LSP.

In one implementation, one or more network devices 410 may store information related to routing of data between servers and/or subscriber devices via network 100. In one implementation, a network device 410 may establish and monitor IP and BFD protocol sessions, between for example, a subscriber device and a server.

While FIG. 4 shows one primary TE-LSP 430 and one secondary TE-LSP 440, network 400 may have multiple other bypasses that a network connection may traverse. Generally, each network device 410 in a TE-LSP can have a bypass path.

EXEMPLARY PROCESSING

Figure 5:
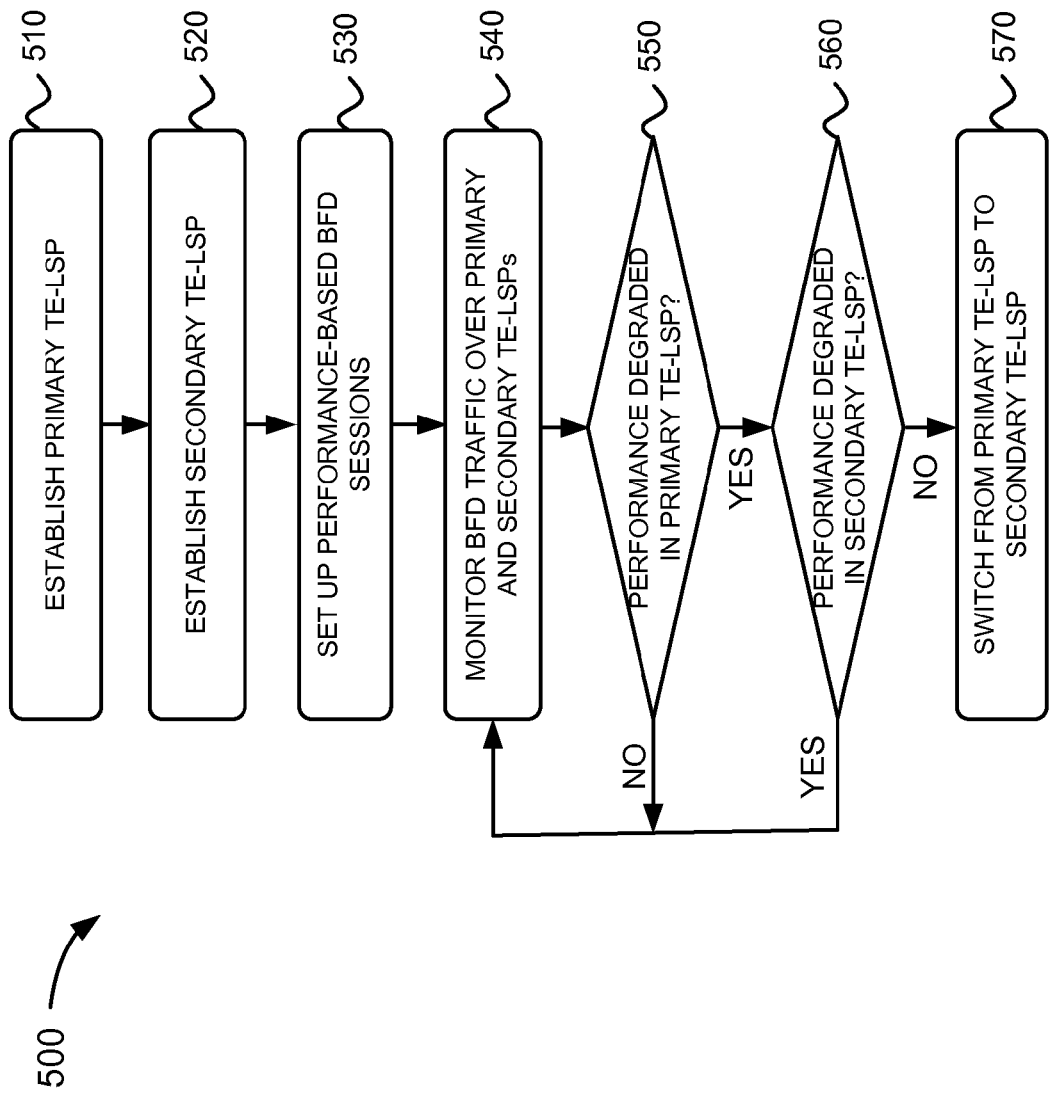
FIG. 5 illustrates an exemplary process to implement TE-LSP session monitoring using BFD protocol mechanisms.

FIG. 5 illustrates an exemplary process 500 to implement TE-LSP session monitoring using BFD protocol mechanisms. In one implementation, exemplary process 500 may be performed by one or more network devices 410. Process 500 may be implemented, for example, within an established IP connection over a network, such as network 400. Examples of process 500 below may be described in the context of an ingress node, such as network device 410-0, which may correspond to edge device 170 of FIG. 1.

Processing may begin, for example, by establishing a primary TE-LSP (block 510) and establishing a secondary TE-LSP (block 520). For example, network device 410-0 may establish a primary TE-LSP and a secondary TE-LSP between network device 410-0 and another node (e.g., egress node 410-3) within an IP session in a network, such as network 400.

Performance-based BFD sessions may be set up (block 530). For example, network device 410-0 may access BFD session parameters in a server (e.g., server 150 of FIG. 1) and/or the BFD session parameters may be transmitted to network device 410-0 after an IP session has been validated and established. BFD sessions may be set up to monitor each link within both a primary TE-LSP and a secondary TE-LSP. BFD parameters may include for example, the BFD mode of operation (asynchronous or demand), whether the BFD session is enabled, a frequency of BFD packet transmissions, a number of dropped BFD packet polls to determine TE-LSP failure/degradation, and enablement of automatic switching between the primary and secondary TE-LSPs.

BFD traffic over the primary TE-LSP and the secondary TE-LSP may be monitored (block 540). For example, in one implementation, network device 410-0 may implement BFD asynchronous mode to transmit BFD control packets using BFD protocols. BFD control packets may be transmitted from network device 410-0 to an adjacent node (e.g., network device 410-1) every 15 seconds, for example. Network device 410-1 may also begin to transmit BFD control packets to network device 410-0 within the established BFD session. The frequency of BFD control packets may be determined from the BFD session parameters contained in server 150 and/or network device 410-0. Session parameters may be retrieved, for example, during BFD session initiation. In one implementation, session parameters for the performance-based BFD session may be different and independent of session parameters for function-based TE-LSP monitoring. For example, timer limits for performance-based BFD session may be shorter than timer limits for function-based TE-LSP monitoring.

In another implementation, network device 410-0 may implement BFD demand mode to conduct monitoring of the primary TE-LSP and the secondary TE-LSP. In demand mode, network device 410-0 may transmit BFD echo packets using BFD protocols. For example, BFD echo packets may be transmitted from network device 410-0 to network device 410-1. Echo packets may be packets that are automatically transmitted back to network device 410-0 from network device 410-1, without requiring control and negotiation of transmission parameters from network device 410-0. The BFD echo packet originally transmitted from network device 410-0 may then be automatically transmitted from network device 410-1 back to network device 410-0 (e.g., as an echo reply).

It may be determined if performance is degraded in the primary TE-LSP (block 550). For example, in accordance with the established BFD session parameters for asynchronous mode, network device 410-0 may determine if performance of the primary TE-LSP is degraded based on receiving BFD control packets. For example, network device 410-0 may expect to receive a BFD control packet every 15 seconds from network device 410-1. If the network device 410-0 does not receive BFD control packets from network device 410-1 for 30 seconds (e.g., 2 polling periods), for example, network device 410-0 may determine that performance of the primary TE-LSP is degraded. The above polling period length (e.g., 15 seconds) and number of polling periods (e.g., 2 polling periods) are exemplary and may be adjusted to any length and/or number to monitor TE-LSP performance.

In another implementation, in accordance with the established BFD session parameters for a demand mode, network device 410-0 may determine if performance of the primary TE-LSP is degraded based on receiving BFD echo packets. For example, network device 410-0 may determine that there is degraded performance upon failing to receive one or more BFD echo packets from network device 410-1 within a particular time interval.

If there is no degraded performance identified in the primary TE-LSP (block 550-NO), then the process may return to block 540 to continue to monitor BFD traffic. If there is degraded performance in the primary TE-LSP (block 550-YES), then it may be determined if performance is degraded in the secondary TE-LSP (block 560). For example, in accordance with the established BFD session parameters, network device 410-0 may determine if performance of the secondary TE-LSP is degraded based on receiving (or not receiving) BFD control packets. For example, in an implementation using BFD asynchronous mode, network device 410-0 may expect to receive a BFD control packet from network device 410-5 using the same polling periods described above with respect to block 550. In another implementation, using BFD demand mode, network device 410-0 may expect to receive a BFD echo packet from network device 410-5 within the particular time interval used in block 550. In other implementations, the criteria for degraded performance (e.g., the polling periods for control packets and/or the reply periods for echo packets) may be different for the secondary TE-LSP than for the primary TE-LSP.

If there is degraded performance in the secondary TE-LSP (block 560-YES), then the process may return to block 540 to continue to monitor BFD traffic. The process will not switch data unit traffic to the secondary TE-LSP if both the primary TE-LSP and the secondary TE-LSP indicate degraded performance.

If there is no degraded performance in the secondary TE-LSP (block 560-NO), then data unit traffic may be switched from the primary TE-LSP to the secondary TE-LSP (block 570). For example, network device 410-0 may change the MPLS shim header in subsequent data units to route data unit traffic through the secondary TE-LSP.

Figure 6:
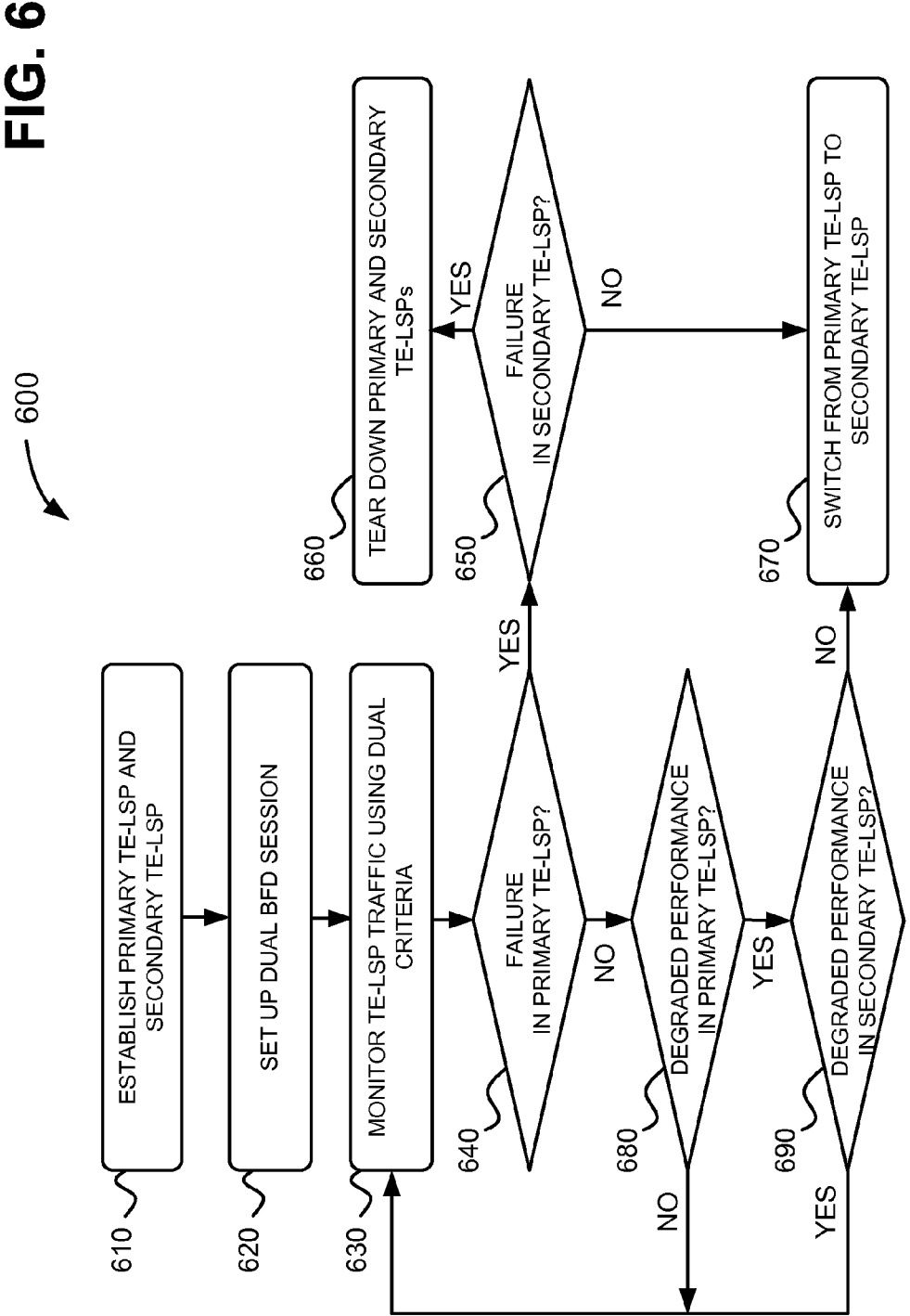
FIG. 6 is another exemplary process to implement TE-LSP session monitoring using BFD protocol mechanisms.

FIG. 6 is another exemplary process 600 to implement TE-LSP session monitoring using BFD protocol mechanisms. Process 600 may include dual TE-LSP monitoring for TE-LSP failure and TE-LSP degradation. In one implementation, exemplary process 600 may be performed by one or more network devices 410, such as network device 410-0 which may correspond to edge device 170 of FIG. 1. Process 600 may be implemented, for example, within an established IP connection over a network, such as network 400.

Processing may begin, for example, by establishing a primary TE-LSP and a secondary TE-LSP (block 610). For example, network device 410-0 may establish a primary TE-LSP and a secondary TE-LSP between network device 410-0 and another node (e.g., egress node 410-3) within an IP session in a network, such as network 400.

A dual-criteria BFD session may be set up (block 620). For example, network device 410-0 may establish a single BFD session on each of the segments within the primary and secondary TE-LSPs, where each BFD session includes two modes of reaction to a BFD data unit loss. One mode of reaction may correspond to degraded performance of a TE-LSP, while another mode may correspond to a failure of a TE-LSP. The dual-criteria BFD session may use asynchronous and/or demand protocols.

LSP traffic may be monitored using dual criteria (block 630). For example, in a first mode of reaction, TE-LSP performance may be deemed degraded when a single packet is lost or when two or more BFD packets are lost over a particular period, X (e.g., 10 seconds). In a second mode of reaction, a TE-LSP may be deemed failed when two or more BFD packets are lost over a particular period, Y (e.g., 30 seconds), where Y is a larger value than X.

It may be determined if there if a failure in the primary TE-LSP (block 640). For example, in accordance with the established BFD session parameters for asynchronous mode, network device 410-0 may determine if the primary TE-LSP has failed based on receiving (or not receiving) BFD control packets at particular intervals. In another implementation, in accordance with the established BFD session parameters for a demand mode, network device 410-0 may determine if the primary TE-LSP has failed based on receiving (or not receiving) BFD echo packets.

If it is determined that there is a failure in the primary TE-LSP (block 640-YES), then it may be determined if there is a failure in the secondary TE-LSP (block 650). For example, similar to the monitoring of the primary TE-LSP described in block 640, network device 410-0 may apply established BFD session parameters for asynchronous mode and/or demand mode to determine if a failure occurs in the secondary TE-LSP.

If a failure is also identified in the secondary TE-LSP (block 650-YES), then the primary TE-LSP and the secondary TE-LSP may be torn down (block 660). For example, network device 410-0 may tear down the primary TE-LSP and the secondary TE-LSP. In one implementation, network device 410-0 may also re-signal the primary TE-LSP and the secondary TE-LSP. If no failure is identified in the secondary TE-LSP (block 650-NO), then there may be a switch from the primary TE-LSP to the secondary TE-LSP (block 670). For example, network device 410-0 may initiate a change to the secondary TE-LSP by changing the MPLS shim header in subsequent data units to route data unit traffic through the secondary TE-LSP rather than the primary TE-LSP.

If there is no failure in the primary TE-LSP (block 640-NO), then it may be determined if performance is degraded in the primary TE-LSP (block 680). For example, in accordance with the established BFD session parameters for asynchronous mode, network device 410-0 may determine if performance of the primary TE-LSP is degraded based on receiving (or not receiving) BFD control packets at particular intervals. For example, network device 410-0 may expect to receive a BFD control packet every 10 seconds from network device 410-1. If the network device 410-0 does not receive BFD control packets from network device 410-1 for 20 seconds (e.g., 2 polling periods), for example, network device 410-0 may determine that performance of the primary TE-LSP is degraded. The above polling period length (e.g., 10 seconds) and number of polling periods (e.g., 2 polling periods) are exemplary and may be adjusted to any length and/or number to monitor TE-LSP performance. In another implementation, in accordance with the established BFD session parameters for a demand mode, network device 410-0 may determine if performance of the primary TE-LSP is degraded based on receiving BFD echo packets. For example, network device 410-0 may determine that there is degraded performance upon failing to receive one or more BFD echo packets from network device 410-1 within a particular time interval.

If there is no degraded performance in the primary TE-LSP (block 680-NO), then the process may return to block 630 to continue to monitor BFD packets. If there is degraded performance in the primary TE-LSP (block 680-YES), then it may be determined if performance is degraded in the secondary TE-LSP (block 690). For example, in accordance with the established BFD session parameters, network device 410-0 may determine if performance of the secondary TE-LSP is degraded based on receiving (or not receiving) BFD control packets using either an asynchronous or demand protocol.

If degraded performance is not identified in the secondary TE-LSP (block 690-NO), then data unit traffic may be switched from the primary TE-LSP to the secondary TE-LSP (block 670). For example, network device 410-0 may change the MPLS shim header in subsequent data units to route data unit traffic through the secondary TE-LSP rather than the primary TE-LSP.

If degraded performance is identified in the secondary TE-LSP (block 690-YES), then the process may return to block 630 to continue to monitor BFD traffic. That is, if both the primary TE-LSP and the secondary TE-LSP have degraded performance, then the TE-LSP may not be switched based on BFD performance monitoring.

FIG. 7 is another exemplary process 700 to implement enhanced quality detection in a network. Process 700 may include use of separate BFD sessions to monitor for path failure and path degradation, respectively. Process 700 may be implemented over a variety of IP routing protocols, such as Multi-topology Routing (MTR) and TE-LSP protocols, where at least two fully or partially non-congruent topologies are used. In one implementation, exemplary process 700 may be performed by one or more network devices, such as network device 410 of FIG. 4. Process 700 may be implemented, for example, within an established IP connection over a network, such as network 140. Assume for further discussion of process 700, that TE-LSP protocols are used.

Processing may begin, for example, by establishing a primary TE-LSP (block 705) and establishing a secondary TE-LSP (block 710). For example, network device 410 may establish a primary TE-LSP and a secondary TE-LSP between network device 410 and another node within the network. Once the primary TE-LSP and secondary TE-LSP are established, process 700 may divide into parallel tracks to monitor for TE-LSP performance and TE-LSP failure.

Performance-based monitoring session may be set up (block 715). For example, network device 410 may set up BFD sessions to monitor each link within both the primary TE-LSP and the secondary TE-LSP. BFD parameters may be provided for each node prior to establishing the BFD sessions. BFD parameters may include for example, the BFD mode of operation (asynchronous or demand), whether the BFD session is enabled, a frequency of BFD packet transmissions, a number of dropped BFD packet polls to determine TE-LSP degradation, and enablement of automatic switching between the primary and secondary TE-LSPs. The BFD sessions may be established, for example, via a three-way handshake between each endpoint.

Performance of links over the primary TE-LSP and the secondary TE-LSP may be monitored (block 720). For example, BFD control packets (e.g., in asynchronous mode) and/or BFD echo packets (e.g., in demand mode) may be transmitted between network device 410 and a next hop node using BFD protocols. Performance of the TE-LSP link may be measured, for example, based on time intervals for receiving the BFD control packets and/or BFD echo packets.

It may be determined if performance is degraded in the primary TE-LSP (block 725). For example, in accordance with the established BFD session parameters for asynchronous mode, network device 410 may determine if performance of a link of the primary TE-LSP is degraded based on receiving BFD control packets. For example, network device 410 may expect to receive a BFD control packet from a next hop node within a particular polling period. If network device 410 does not receive BFD control packets from the next hop node within the polling period, network device 410 may determine that performance of the primary TE-LSP is degraded.

In another implementation, in accordance with the established BFD session parameters for a demand mode, network device 410 may determine if performance of a link in the primary TE-LSP is degraded based on receiving BFD echo packets. For example, network device 410 may determine that there is degraded performance upon failing to receive one or more BFD echo packets from a next hop node within a particular time interval.

If no degraded performance is identified in the primary TE-LSP (block 725-NO), then the process may return to block 720 to continue to monitor TE-LSP performance. If there is degraded performance in the primary TE-LSP (block 725-YES), then it may be determined if performance is degraded in the secondary TE-LSP (block 730). For example, network device 410 may use the same criteria as used for the primary TE-LSP to determine if performance of the secondary TE-LSP is degraded. In other implementations, the criteria for degraded performance (e.g., the polling periods for BFD control packets and/or the reply periods for BFD echo packets) may be different for the secondary TE-LSP than for the primary TE-LSP.

If there is degraded performance in the secondary TE-LSP (block 730-YES), then the process may return to block 720 to continue to monitor TE-LSP performance. The process will not switch data unit traffic to the secondary TE-LSP if both the primary TE-LSP and the secondary TE-LSP have degraded performance.

If there is no degraded performance in the secondary TE-LSP (block 730-NO), then data unit traffic may be switched from the primary TE-LSP to the secondary TE-LSP (block 735). For example, network device 410-0 may change the MPLS shim header in subsequent data units to route data unit traffic through the secondary TE-LSP.

Referring to the other track of process 700 to monitor for TE-LSP failure, a function-based monitoring session may be set up (block 740). For example, network device 410 may set up a BFD session to monitor the primary TE-LSP and a BFD session to monitor the secondary TE-LSP. BFD parameters may include for example, the BFD mode of operation (asynchronous or demand), whether the BFD session is enabled, a frequency of BFD packet transmissions, a number of dropped BFD packet polls to determine TE-LSP failure, and enablement of automatic switching between the primary and secondary TE-LSPs.

Performance over the primary TE-LSP and the secondary TE-LSP may be monitored (block 745). For example, BFD control packets (e.g., in asynchronous mode) and/or BFD echo packets (e.g., in demand mode) may be transmitted between network device 410 and an egress node for the LPS using BFD protocols. TE-LSP performance may be measured, for example, based on time intervals for receiving the BFD control packets and/or BFD echo packets.

It may be determined if there is a failure in the primary TE-LSP (block 750). For example, in accordance with the established BFD session parameters for asynchronous mode, network device 410 may determine if the primary TE-LSP fails based on receiving BFD control packets. For example, network device 410 may expect to receive a BFD control packet from an egress node within a particular polling period. If network device 410 does not receive BFD control packets from the egress node within a particular number of polling periods, network device 410 may determine that the primary TE-LSP has failed.

In another implementation, in accordance with the established BFD session parameters for a demand mode, network device 410 may determine the primary TE-LSP has failed based on receiving BFD echo packets. For example, network device 410 may determine that there is degraded performance upon failing to receive two or more BFD echo packets from an egress node within a particular time interval.

If no failure is identified in the primary TE-LSP (block 750-NO), then the process may return to block 720 to continue to monitor TE-LSP performance. If there is a failure in the primary TE-LSP (block 750-YES), then the primary TE-LSP may be torn down and re-signaled (block 755). For example, network device 410 may tear down the primary TE-LSP and re-signal a new primary TE-LSP.

It may be determined if there is a failure in the secondary TE-LSP (block 760). For example, network device 410 may use the same criteria as used for the primary TE-LSP to determine if there is a failure in the secondary TE-LSP. In other implementations, the criteria for failure (e.g., the polling periods for BFD control packets and/or the reply periods for BFD echo packets) may be different for the secondary TE-LSP than for the primary TE-LSP.

If there is a failure in the secondary TE-LSP (block 760-YES), then the secondary TE-LSP may be torn down and re-signaled (block 765). For example, network device 410 may tear down the secondary TE-LSP and re-signal a new secondary TE-LSP.

If there is no failure in the secondary TE-LSP (block 760-NO), then data unit traffic may be switched from the primary TE-LSP to the secondary TE-LSP (block 735). For example, network device 410 may change the MPLS shim header in subsequent data units to route data unit traffic through the secondary TE-LSP.

CONCLUSION

Implementations described herein may use Bidirectional Forwarding Detection (BFD) sessions over a primary and secondary network connection path. The BFD sessions may include aggressive monitoring to detect degraded performance (e.g., dropped packets, jitter and/or delays over a threshold limit) and path failure. When degraded performance is detected, a network node may automatically switch from the primary connection path to a secondary connection path if the secondary connection is not also experiencing degraded performance or failure.

The foregoing description of implementations provides illustration and description, but is not intended to be exhaustive or to limit the invention to the precise form disclosed. Modifications and variations are possible in light of the above teachings or may be acquired from Also, while series of blocks have been described with regard to FIGS. 5-7, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   monitoring, by a device, performance of a primary path, that includes a plurality of first links, based on one or more sessions for each first link of the primary path;
   monitoring, by the device, performance of a secondary path, that includes a plurality of second links, based on one or more sessions for each second link of the secondary path;
   determining, by the device, at least one of a degraded performance of the primary path, based on the monitoring of the performance of the primary path, or a failure of the primary path, based on a function-based session for the primary path;
   determining, by the device, an availability of the secondary path based on a function-based session for the secondary path; and
   automatically switching, by the device, a flow of traffic from the primary path to the secondary path when at least one of the performance of the primary path is degraded or the failure of the primary path occurs,
      determining the failure of the primary path and determining the availability of the secondary path being further based on one or more polling periods, and
      a polling period for the one or more sessions for each first link and the one or more sessions for each second link is different than a polling period for the function-based session for the primary path and the function-based session for the secondary path.

2. The method of claim 1, further comprising:
   receiving one of more echo packets; and
   using the one or more received echo packets to determine the degraded performance of the primary path.

3. The method of claim 1, further comprising:
   determining if one or more packets are received during a predetermined interval; and
   determining, based on whether the one or more packets are received during the predetermined interval, a failure of the primary path.

4. The method of claim 1, further comprising:
determining a failure in the secondary path; and
tearing down the primary path and the secondary path based on determining a failure in the primary path and the secondary path.

5. The method of claim 1, further comprising:
determining the failure of the primary path when no packets are received during two consecutive polling periods.

6. The method of claim 1, where the flow of traffic from the primary path to the secondary path is automatically switched by changing a header in one or more data units, where the one or more data units are included in the traffic.

7. The method of claim 1, where
the one or more sessions are Bidirectional Forwarding Detection (BFD) sessions,
the primary path is a primary traffic engineering Label Switched Path (TE-LSP), and
the secondary path is a secondary TE-LSP.

8. A system comprising:
a device to:
monitor performance of a primary path, that includes a plurality of first links, based on one or more sessions for each first link of the primary path;
monitor performance of a secondary path, that includes a plurality of second links, based on one or more sessions for each second link of the secondary path;
determine at least one of a degraded performance of the primary path, based on the monitoring of the performance of the primary path, or a failure of the primary path, based on a function-based session for the primary path;
determine an availability of the secondary path based on a function-based session for the secondary path; and
automatically switch a flow of traffic from the primary path to the secondary path when at least one of the performance of the primary path is degraded or the failure of the primary path occurs,
the device determining the failure of the primary path and determining the availability of the secondary path based on one or more polling periods, and
a polling period for the one or more sessions for each first link and the one or more sessions for each second link is different than a polling period for the function-based session for the primary path and the function-based session for the secondary path.

9. The system of claim 8, where the device is further to:
receive one of more echo packets; and
use the one or more received echo packets to determine the degraded performance of the primary path.

10. The system of claim 8, where the device is further to:
determine if one or more packets are received during a predetermined interval; and
determine, based on whether the one or more packets are received during the predetermined interval, a failure of the primary path.

11. The system of claim 8, where the device is further to:
determine a failure in the secondary path; and
tear down the primary path and the secondary path based on determining a failure in the primary path and the secondary path.

12. The system of claim 8, where the device is further to:
determine the failure of the primary path when no packets are received during two consecutive polling periods.

13. The system of claim 8, where, when automatically switching the flow of traffic from the primary path to the secondary path, the device is further to:
change a header in one or more data units, where the one or more data units are included in the traffic.

14. The system of claim 8, where
the one or more sessions are Bidirectional Forwarding Detection (BFD) sessions,
the primary path is a primary traffic engineering Label Switched Path (TE-LSP), and
the secondary path is a secondary TE-LSP.

15. A device comprising,
logic to monitor performance of a primary path, that includes a plurality of first links, based on one or more sessions for each first link of the primary path;
logic to monitor performance of a secondary path, that includes a plurality of second links, based on one or more sessions for each second link of the secondary path;
logic to determine at least one of a degraded performance of the primary path, based on the monitoring of the performance of the primary path, or a failure of the primary path, based on a function-based session for the primary path;
logic to determine an availability of the secondary path based on a function-based session for the secondary path; and
logic to automatically switch a flow of traffic from the primary path to the secondary path when at least one of the performance of the primary path is degraded or the failure of the primary path occurs,
the logic to determine the failure of the primary path and the logic to determine the availability of the secondary path determining the failure of the primary path and the availability of the secondary path, respectively, based on one or more polling periods, and
a polling period for the one or more sessions for each first link and the one or more sessions for each second link is different than a polling period for the function-based session for the primary path and the function-based session for the secondary path.

16. The device of claim 15, where the device further comprises:
logic to receive one of more echo packets; and
logic to use the one or more received echo packets to determine the degraded performance of the primary path.

17. The device of claim 15, where the device further comprises:
logic to determine if one or more packets are received during a predetermined interval; and
logic to determine, based on whether the one or more packets are received during the predetermined interval, a failure of the primary path.

18. The device of claim 15, where the device further comprises:
logic to determine a failure in the secondary path; and
logic to tear down the primary path and the secondary path based on determining a failure in the primary path and the secondary path.

19. The device of claim 15, where the device further comprises:
logic to determine the failure of the primary path when no packets are received during two consecutive polling periods.

20. The device of claim 15, where the device further comprises:
logic to change, when automatically switching the flow of traffic from the primary path to the secondary path, a header in one or more data units, where the one or more data units are included in the traffic.

* * * * *